United States Patent
Lin et al.

(10) Patent No.: US 7,167,890 B2
(45) Date of Patent: Jan. 23, 2007

(54) MULTIPLIER-BASED PROCESSOR-IN-MEMORY ARCHITECTURES FOR IMAGE AND GRAPHICS PROCESSING

(75) Inventors: Rong Lin, Geneseo, NY (US); Martin Margala, Pittsford, NY (US)

(73) Assignee: University of Rochester, Rochester, NY (US)

( * ) Notice: Subject to any disclaimer, the term of this patent is extended or adjusted under 35 U.S.C. 154(b) by 701 days.

(21) Appl. No.: 10/409,059

(22) Filed: Apr. 9, 2003

(65) Prior Publication Data

US 2003/0222879 A1 Dec. 4, 2003

Related U.S. Application Data

(60) Provisional application No. 60/370,723, filed on Apr. 9, 2002, provisional application No. 60/370,722, filed on Apr. 9, 2002.

(51) Int. Cl.
*G06F 7/52* (2006.01)
(52) U.S. Cl. .................................... 708/625
(58) Field of Classification Search ............... 708/625, 708/627, 628, 632, 518
See application file for complete search history.

(56) References Cited

U.S. PATENT DOCUMENTS

| | | | |
|---|---|---|---|
| 4,811,269 A * | 3/1989 | Hirose et al. | 708/627 |
| 6,014,684 A | 1/2000 | Hoffman | |
| 6,286,024 B1 | 9/2001 | Yano et al. | |
| 6,523,055 B1 * | 2/2003 | Yu et al. | 708/603 |
| 6,704,762 B1 * | 3/2004 | Inoue | 708/628 |
| 6,718,465 B1 | 4/2004 | Lin | |

\* cited by examiner

*Primary Examiner*—Chuong D. Ngo
(74) *Attorney, Agent, or Firm*—Blank Rome LLP

(57) ABSTRACT

A Procesor-In-Memory (PIM) includes a digital accelerator for image and graphics processing. The digital accelerator is based on an ALU having multipliers for processing combinations of bits smaller than those in the input data (e.g., 4×4 adders if the input data are 8-bit numbers). The ALU implements various arithmetic algorithms for addition, multiplication, and other operations. A secondary processing logic includes adders in series and parallel to permit vector operations as well as operations on longer scalars. A self-repairing ALU is also disclosed.

9 Claims, 10 Drawing Sheets

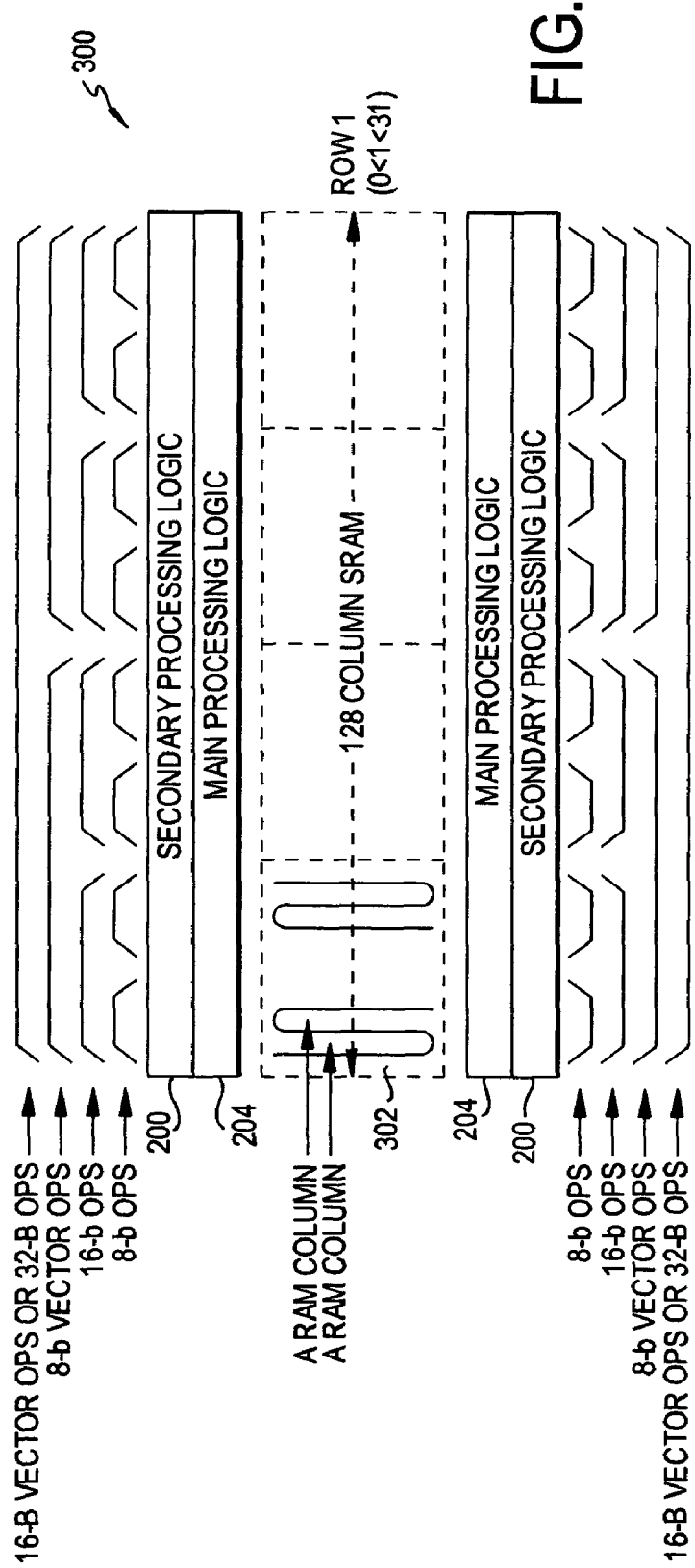

MULTIPLIER-BASED PROCESSOR-IN-MEMORY ARCHITECTURES FOR IMAGE AND GRAPHICS PROCESSING

REFERENCE TO RELATED APPLICATIONS

The present application claims the benefit of U.S. Provisional Application Nos. 60/370,722 and 60/370,723, both filed Apr. 9, 2002, whose disclosures are hereby incorporated by reference in their entireties into the present disclosure.

STATEMENT OF GOVERNMENT INTEREST

The work leading to the present application was supported, in part, by National Science Foundation grant CCR-0073469 and by New York State Office of Science, Academic & Research (MDC) grant NYSTAR 02332105. The government has certain rights in the present invention.

FIELD OF THE INVENTION

The present invention is directed to a Processor-in-Memory (PIM) and more particularly to a PIM for graphics processing with increased efficiency, flexibility, and self-repairability.

DESCRIPTION OF RELATED ART

During the past few years, the forces driving technology have changed significantly. Advances in integrated circuit technology will soon allow the integration of several billions of transistors on a single chip. Two new trends have been emerging. The first new trend is that of multimedia applications. New innovations in circuit topology have enabled the use of real-time data types like video, speech, animation, and music. The second trend is the growing demand for portable computing and communication devices. Such devices now support a constantly expanding range of functions. This leads to greater demand for computing power, but at the same time, the size, weight, and power consumption of these devices must remain constant.

These two new trends, multimedia applications and portable electronics, will lead to a new application domain with a single personal mobile computing and communication device. To support such an environment, new computer architectures will be required. These new architectures must support four major requirements:

I. High performance for multimedia functions,
II. Energy and power efficiency,
III. Small size, and
IV. Low design complexity.

Operations will be performed primarily in a single wide data path with 8 to 16 bits rather than 32 or 64 bits. Functions like image, voice, and signal processing require performing the same operation across sequences of data in a vector or SIMD (single instruction, multiple data) fashion (fine-grained parallelism). Also, in many applications a pipeline of functions will process a single stream of data to produce the end result. Another characteristic of the new architectures will be a high memory bandwidth and a high network bandwidth. In addition, each function should be executed with minimum possible energy cost. A final requirement will be low design complexity and scalability.

It has been found that the processor-in-memory (PIM) architectures (also known as intelligent RAMs or computational RAMs, abbreviated as CRAMs) are promising candidates for the new application domain. There have been numerous PIM architectures proposed over the years. They can be classified into three different categories, based on the role of the processor: main processor (or processors) in the system; intelligent memory system of a PC, workstation or server; and ASP (application specific processor) or accelerator in memory.

Examples of PIMs from the first two categories are Berkeley's IRAM architecture, DIVA, developed by the University of Wisconsin-Madison, and the FlexRAM architecture, developed by the University of Illinois at Urbana-Champaign. Processing Elements (PE), embedded in these architectures, are equivalent to standard CPUs. They have high transistor-count, run at high frequencies and are attached to a DRAM array or DRAM memory banks. In addition to high complexity, which results in a large area overhead (30–70%), these architectures experience bottlenecks in increased leakages of the DRAM due to a very high temperature dissipation of the processing elements. As a result, the retention frequency will have to be increased, and that will push the power consumption levels even higher. Lastly, the testing cost of the stand-alone DRAM is already high, and adding a microprocessor to it could increase the test time, and thereby costs, significantly.

The PIM architectures from the third category have PEs significantly less complex, performing bit-serial, bit-parallel, or bit-sliced operations. These architectures follow a SIMD model and are more effective in satisfying the requirements of multimedia portable device applications. The multimedia applications demand execution of low- to medium-level image, graphics, and video processing algorithms. These algorithms have an inherent high degree of parallelism. For instance, in filter operations such as median filter, spatial filter, etc., the output of each pixel is a combination of the pixel values in a predefined window centered at this pixel, and filter operations on distant pixels can be performed independently and in parallel. In image compression, for example, if Discrete Cosine Transform (DCT) is applied to an 8×8 block of pixels, the DCT of the non-overlapped neighboring blocks can be executed independently. In graphics, Gradient calculation, Classification, and Phong shading algorithms are very common operations. One of the operations required by shading is an inner-product computation on centered voxel and six of its neighbors (face grouping). This operation is performed on every voxel in the 3D data set. This operation can be easily performed in parallel. Moreover, future portable devices with multimedia capabilities will require 8-b to 16-b data.

There have been several implementations of embedded processing elements proposed in the literature. Elliott et al and Le et al have proposed two PIM architectures, the first with a less complex PE pitch-matched to one column of DRAM and the second, a more complex PE pitched to an SRAM column (Elliott, D. G., Stumm, M., Shelgrove, W. M., Cojocaru, C., and McKenzie, R., "Computational RAM: Implementing Processors in Memory," *IEEE Design & Test of Computers*, pp. 32–41, January–March 1999; Le, T. M., Snelgrove, W. M., and Panchanathan, "SIMD Processor Arrays for Image and Video Processing: A Review," in S. Panchanathan, F. Sijstermans, and S. I. Sudharsanan, editors, *Multimedia Hardware Architectures*, vol. 3311 of *SPIE Proceedings*, pp.30–41, 1998). The first implementation requires that data be stored orthogonally to the way the host would expect to access it. The processing element performs a bit-serial arithmetic, and the bits of each vector are stored along a column during separate memory accesses. The main disadvantage of such a simple PE is that operations such as multiplication require significantly more memory accesses to store intermediate results. Therefore, the multiplication operation has small performance and increased power consumption. The second implementation is improved for arithmetic operations such as addition and multiplication because of additional dedicated registers in the PE. The operations are performed in a bit-parallel fashion. The latency for multiplication is reduced because of the reduced number of RAM cycles; however, it does not provide sufficient throughput for multimedia support. Finally, both designs are implemented using dynamic logic, which results in higher power consumption due to the precharge phase within every cycle.

A DSP-RAM has been proposed for parallel digital signal processing. The embedded PE has a very high transistor count. The PE is pitch-matched to 16 columns. The PE has in the order of 15000 transistors. Due to its complexity, it has a very large area overhead, and the implementation would not be cost effective.

The IMAP architecture presents a PE that performs multiplication sequentially using an add-and-shift algorithm. An 8-b×8-b multiplication takes 40 cycles to reach a result. In order to perform it more efficiently, a table look-up algorithm would have to be used. That would reduce the time to 11 cycles, but several steps would be needed to load a 256 entry table for 4-b×4-b multiplication into a memory. This approach has, therefore, severe limitations for image and graphics applications.

The Pixel-Parallel Processor (PPP) uses a dynamic PE with 95 transistors. The architecture performs bit-parallel arithmetic operations. The architecture has two major limitations. First, the dynamic logic implementation has high power consumption, and therefore, it would be difficult for use in a portable environment. The PPP architecture has been proposed for desktop systems. Secondly, the PE is very inefficient in performing multiplication operations. It needs, as reported by its authors, $4n^2-n-1$ instructions, where n is the bit length. So to perform 8-b or 16-b multiplication, as is common in image and graphics processing, the operation would require 247 and 1007 instructions respectively.

A SIMD array processor for real-time early vision processing called ABACUS has also been proposed. The PE performs arithmetic and communication functions. It consists of 64 1-bit registers organized into two banks. Furthermore, it has two 3-input ALUs. Finally, the PE has also a 1-bit network and background I/O interface. While it can perform operations such as Add, Compare, Shift, Accumulate, with high throughput, the architecture lacks several orders of magnitude behind in multiplication.

As will be understood from the above, the existing and previously proposed architectures all have limitations which it would be desirable to avoid, particularly in the context of graphics processing.

SUMMARY OF THE INVENTION

It will be apparent that a need exists in the art for a high-bandwidth digital accelerator for image and graphics applications.

To achieve the above and other objects, the present invention is directed to a Processor-In-Memory (PIM) having a partial product bit matrix decomposition based ALU core. The PIM allows the implementation of pixel-parallel and voxel-parallel image-graphics PIMs.

The PIM comprises an array of small multipliers (for example, $2^{10}$ 4×4 multipliers), which can be dynamically reconfigurable for 8-b and 16-b add, subtract, compare and multiply operations, as well as for vector-vector and matrix-vector multiplications, all in SIMD parallel form. The PIM can be implemented as an SRAM having grouped pixel columns, or grouped voxel columns. Both the ALU and the SRAM are scalable and can be easily extended.

The PIM for the processors is organized as follows: Each column has one sense amplifier and a write driver. Every 8 and 16 and 64 columns of memory cells form a mini group, sub group and group, sharing a mini-PE, a sub-PE and a PE respectively. The memory cells are organized in two levels, for two possible data formats (8-b and 6-b fixed point unsigned or 2's complement numbers).

The basic operations of each ALU include write, copy, addition, subtraction, comparison, move (to neighbors), and multiplication. Inner product and matrix-vector operations are also supported directly.

The following are features of at least some embodiments of the pixel-parallel PIM: (1) The basic (8-b) operations, i.e. multiply, sum, sub (absolute difference), write, copy and move (to four neighbor columns), are all provided uniformly by the reconfigurable (decomposed) 8×8 multiplier; they all take one operation except two for subtraction. (2) The movement of each 8-b word from/to memory cells to/from the 16 input or 16 output registers of the multiplier (or neighbor columns) is in parallel. (3) A total of 15 operation bits are used by the SIMD instruction set for the direct function generation (i.e. the reconfiguration of the multiplier). (4) The extended (16-bit) operations are efficiently supported. The number of instructions needed are: two (sum), four (sub), five (multiply). (5) Both memory columns and main components (4×4 multipliers) of the processing logic are repairable with low cost. The redundancy rate for repairing both memory columns and the base (4×4) multipliers is 1/4, i.e. one extra for every four components. (6) An exhaustive test procedure with a reduced test vector length (from 5*2**16 to 1.5*2**10) is provided for each ALU (with repair test included). (7) A few recently proposed tiny robust pass-transistor based parallel counters are employed as the building block for the processing logic. The new circuits have been simulated and shown high-performance, low-power, minimum transistor count using about 290 transistors per column for pixel-parallel processor, and a very good preliminary layout.

The voxel-parallel PIM includes all basic operations described for pixel-parallel PIM but scaled for 16-b data. It has three important additions to the target application (volume rendering). The 4×4-16-b inner product, 32-b multiplication and matrix-vector 4×4×4-16-b multiplication are directly supported. A significant improvement over the best known architectures with the same VLSI cost for volume rendering (block of $2^{12}$ voxels) can be expected. The extra cost for the extension is minimum. It requires about 600 transistors per column.

The PIM architectures according to the present invention have a major advantage over the well-known designs: the capability of trading (or decomposing) bitwidth of operands for the size of the array to be processed. The trading can take place not only at software level, but also at hardware level.

The present invention has been found to outperform previously proposed processing-in-memory architectures in speed, area and power by up to several orders of magnitude. Several variations of the design have been implemented in 2.5V 0.25 μm and 1.8V 0.18 μm CMOS technology.

One embodiment of the present invention provides a highly regular self-repairable and reconfigurable 16×16-b parallel multiplier/inner product processor along with a low-power fast CMOS circuit implementation and an exhaustive DFT method. The circuit can be efficiently reconfigured into 17 different architectures, recovering the specified faults over 52% of the transistors. Both the repairing and testing take the advantage of the clean partitioning of the circuit, which results in high controllability and observability, inherent in the decomposition approach. The processor can be directly extended for operations in twos complement form, with a negligible amount of VLSI area increase. The repairing coverage can be extended to allow one fault mid-final adder and one fault 4-bit group adder in the final adder to be recovered, which provides 17*5*5=425 different architectures for repairing. This would recover the specified faults for almost all transistors in the circuit. However, the additional VLSI area (transistors and, particularly, lines), the delay (5 ns) and test vector length ($1.5*2^{17}$) needed are non-proportionally larger, mainly due to that all component inputs must be collected, instead of generated.

The repair mechanism (or repair algorithm) has a unique feature: It uses one redundant component (say, 4×4 multiplier) to efficiently repair any one of four components, say, 4 4×4 multipliers (which is equivalent to 16 4×4 multipliers when a regular 16×16 multiplier, instead of the invented arithmetic unit, is used), with a minimum repairing line connections. The minimum connection is achieved due to that the inputs to each component can be generated directly under the algorithm of the self-repairing embodiment. On the other hand, in the conventional technique, all inputs for all components must be physically routed to the extra component, which requires much large VLSI area.

BRIEF DESCRIPTION OF THE DRAWINGS

Preferred embodiments of the present invention will be set forth in detail with reference to the drawings, in which:

FIG. 3 shows a schematic diagram of an SRAM implemented with the arithmetic logic unit of FIG. 1 and the secondary processor logic of FIG. 2;

DETAILED DESCRIPTION OF THE PREFERRED EMBODIMENTS

Figure 1:
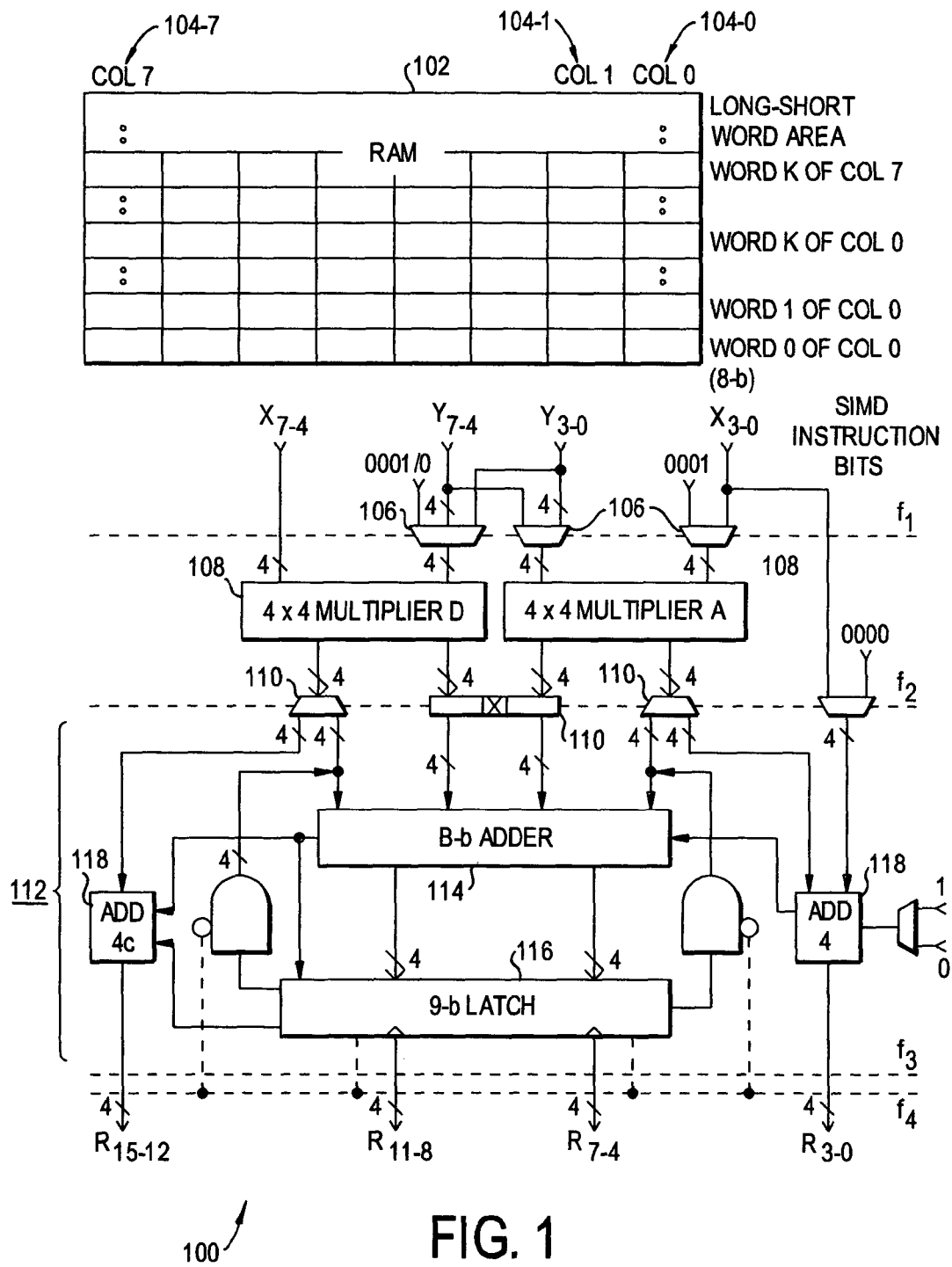
FIG. 1 shows a schematic diagram of an arithmetic logic unit according to a first preferred embodiment.

Preferred embodiments of the present invention will be set forth in detail with reference to the drawings, in which like reference numerals refer to like elements throughout. The first preferred embodiment provides both a new arithmetic scheme for ALU design and a new digital accelerator architecture for implementing that arithmetic scheme. The second preferred embodiment adds self-repair capabilities.

The arithmetic scheme has the following characteristics:

1. It uses small multipliers (ex. 4×4-b) instead of full-adder and/or other parallel counters as building blocks. That provides greater flexibility for enlarging functionality through reconfiguration.

2. It enables multipliers directly dealing with wider sense arithmetic operations including:
   a family of multiplications: 8×8-b, 16×16-b, 32×32-b, vector×vector, and vector×matrix, i.e. size-4 vector and size 4×4 matrix products; and
   merged arithmetic operations including addition, subtraction, compare and absolute-value.

Such extensions are not difficult to obtain. It is natural to see that multiplications are positioned in the middle, closer to both, lower-level operations of +, −, comp. and higher level vector operations.

3. It is excellent on SPAT (speed, power, area and test).

Many emerging applications, including new processing techniques for image and graphics, require a higher degree of parallelism in data processing and/or higher bandwidth of memory macro processing and therefore require ALUs with a maximum functionality for an operation with a minimum VLSI area for silicon efficiency and an with optimal performance matching between logic and memory. However, the traditional arithmetic schemes do not have a sufficient and direct support to the new processing environment. The partial product bit matrix decomposition based arithmetic scheme according to the preferred embodiments has shown a potential to provide significantly better support for emerging applications, particularly for pixel-parallel image processor and voxel-parallel volume renderer designs.

For simplicity we show in FIG. 1 an 8×8 multiplier (or near a half of a 16×16 multiplier) using basically only two 4×4 multipliers, corresponding to a half of a regularly decomposed 8×8 partial product matrix. The design is called a multiplier decomposition based design, which could be applied recursively for large multipliers in a similar way.

The multiplier decomposition based ALU 100 of FIG. 1 operates on data stored in a RAM 102 organized into eight RAM columns 104-0, 104-1, . . . 104-7, which corresponds to eight pixels of an image or eight voxels of volume data. The details, a sense amplifier and a write driver for each RAM column, and the connections between neighbor columns are not shown; however, those skilled in the art who have reviewed the present disclosure will know to provide them. The eight columns are connected through muxes 106 to two 4×4 multipliers 108, whose outputs are connected through muxes 110 to an adder stage 112 which includes an eight-bit adder 114, a nine-bit latch 116, and two four-bit adders 118, thus providing for outputs of up to sixteen bits.

The 8×8 multiplier 100 is responsible for 8 SRAM columns 104-0, 104-1, . . . 104-7 for all possible on-chip operations related to those pixels and/or voxels. The SIMD instruction bits (f1 to f4 here) control the MUXs and allow each 8-bit operations of +, − and comp to be performed in one instruction cycle (which about matches the SRAM read/write time). The memory access delay is 1.3 to 1.7 ns, and logic delay is near 1ns based on our simulation with 0.18 μm 1.8V process. The SRAM read/write is overlapped with the logic execution.

The ALU 100 operates in the following manner to perform various operations.

The addition requires one instruction execution of X(3–0)+Y(3–0)*0001+0. The subtraction and comparison work similarly, but with X inputs complemented, and carry-in 1 is selected. The add/sub operation generates an 8-b result R(7–0) while comp generates a 1-b carry-out which is added with X(7–4)*0000 and placed in R(15–8). A multiplication requires two instruction executions: the first generating X(3–0)*Y(7–4)+X(7–4)*Y(3–0); the second generating X(3–0)*Y(3–0) and X(7–4)*Y(7–4) which accumulate with the result of first instruction to yield the final product. Since a 16-b product is produced for a complete result, two write operations on such a RAM are used for any complete ALU design. Thus, for all 8-b basic arithmetic operations, the speed of our ALU on such a RAM is optimal; in other words, our logic perfectly matches memory performance.

The ALU also possesses another two important features: the maximum functionality and minimum VLSI area. The functionality of the ALU can be enlarged through combining two or multiple contiguous such small ALUs plus a little extra logic. The results shown in our preliminary study that 16-b and 32-b operations of +, –, comp. x, and vector-vector operations on 8-b and 16-b numbers can be achieved with relative insignificant amount of logic and VLSI area. Table I summarizes the operations of the proposed processor. To the best of our knowledge, its silicon efficiency is superior to any known approaches.

TABLE I

SUMMARY OF THE OPERATIONS

| operation | output | # memory accesses | # instructions |
| --- | --- | --- | --- |
| 8 ± 8 | 8 (result) & 8 (carry) | 1 | 1 |
| 8 comp 8 | 8 (carry) | 1 | 1 |
| 8 × 8 | 8 (MSBs) & 8 (LSBs) | 2 | 2 |
| 4 × 8 × 8 vector inner product | 8 (MSBs) & 8 (LSBs) | 2 | 2* |
| 16 ± 16 | 16 (result) | 1 | 1 |
| 16 comp 16 | 8 (carry) | 1 | 1 |
| 16 × 16 | 16 (MSBs) & 16 (LSBs) | 2 | 2 |
| 4 × 16 × 16 vector inner product | 16 (result) | 2 | 2* |
| 32 ± 32 | 32 (result) | 1 | 1 |
| 32 comp 32 | 8 (carry) | 1 | 1 |
| 32 × 32 | 32 (result) | 2 | 2* |

*the final addition & the first instruction are overtapped

The ALU disclosed above can be incorporated into a digital accelerator which is capable of either processing a page of image with 32×128 pixels or rendering a block of volume data with 8×16×32 voxels. Each pixel or voxel may allow to have a data ranging from 32 bits (prototype) to 512 bits (for a full application). It will consist of five major parts: the main processing logic which is a multiplier decomposition based ALU for 16 RAM columns (similar to FIG. 1), the secondary processing logic which is shown in FIG. 2; an SRAM of size 2048 (columns)×n (bits-per-column, $32 \leq n \leq 512$) as shown in FIG. 3; the interconnection of processing elements (or Digital Accelerator columns, each column corresponding to a 1-b virtual processing element) as shown in FIGS. 4A and 4B and a parallel-serial access memory for input-output image/graphics data as shown in FIG. 5.

Figure 2:
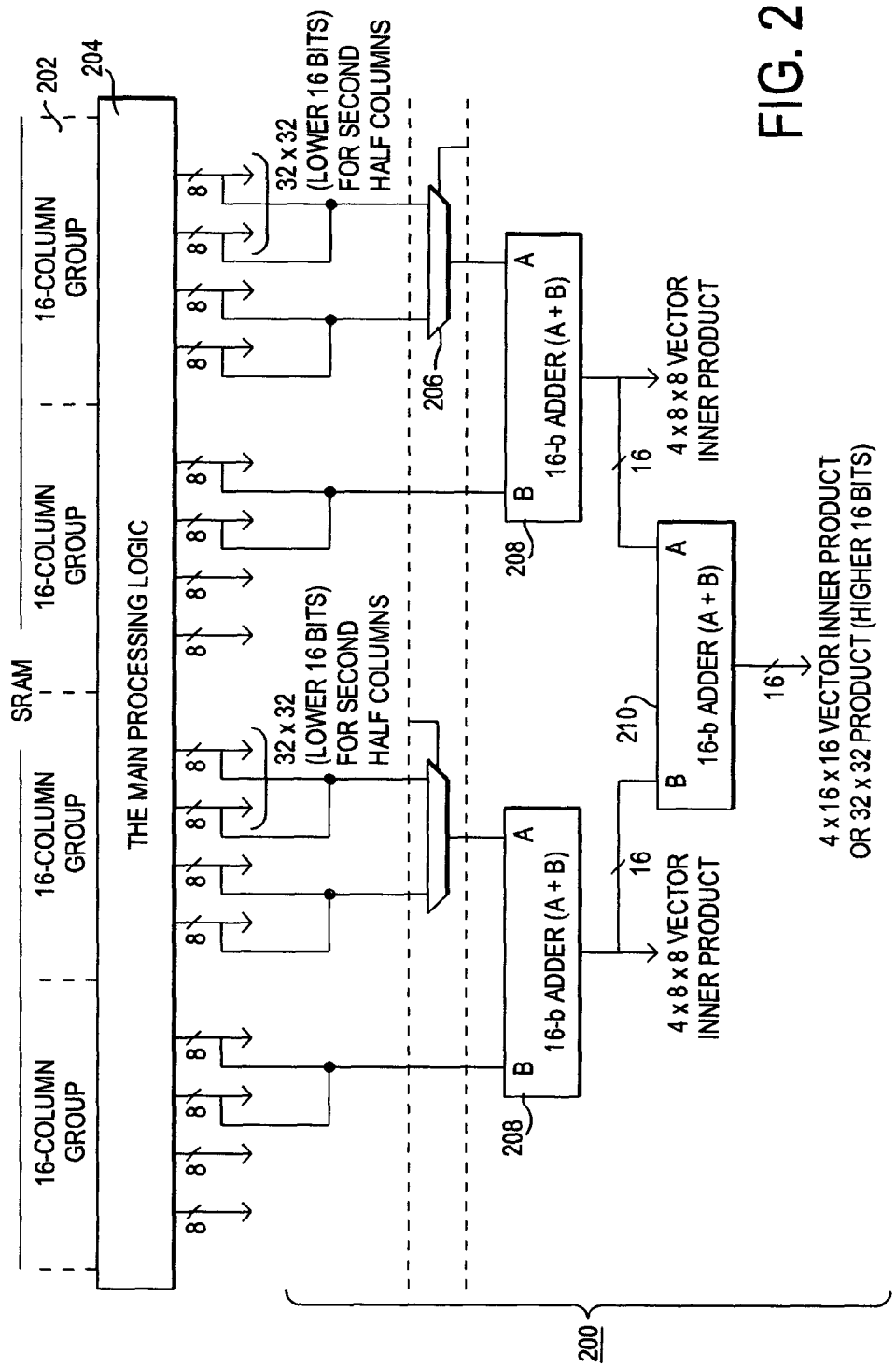
FIG. 2 shows a schematic diagram of secondary processor logic for use with the arithmetic logic unit of FIG. 1.

FIG. 2 shows a secondary processing logic 200 for use with RAM columns 202 and ALUs 204 (main processing logic) like those of FIG. 1, except adapted for 16-column groups rather than 8-column groups. The secondary processing logic 200 includes 16×2–1 MUXes 206 for connecting the outputs of the main processing logic 204 to three 16-b CLA adders 208, 210 to generate the desired vector x vector or 32-bit products. The execution of a secondary processing logic instruction is overlapped with the first instruction of the 16-b multiplication. There is no resource in conflict. In such a way a significant total delay reduction for vector operations is achieved.

The SRAM row design and implementation are made by simply mounting the processing logic units into existing SRAM models. The prototype Digital Accelerator involves only a small size SRAM enough to illustrate the functionality and the performance. FIG. 3 shows a sample row 300 of a digital accelerator; up to 32 rows in a single accelerator are contemplated. The row 300 includes 128-column SRAM 302, main processing logic 204, and secondary processing logic 200.

Figure 4A:
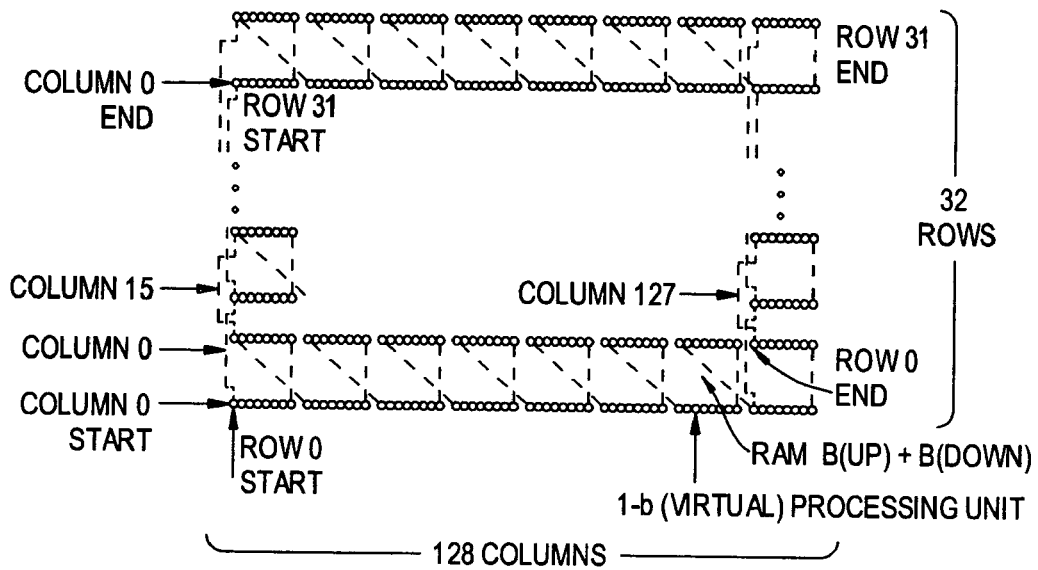
FIGS. 4A and 4B show interconnections among processor elements in the SRAM of FIG. 3.
Figure 4B:
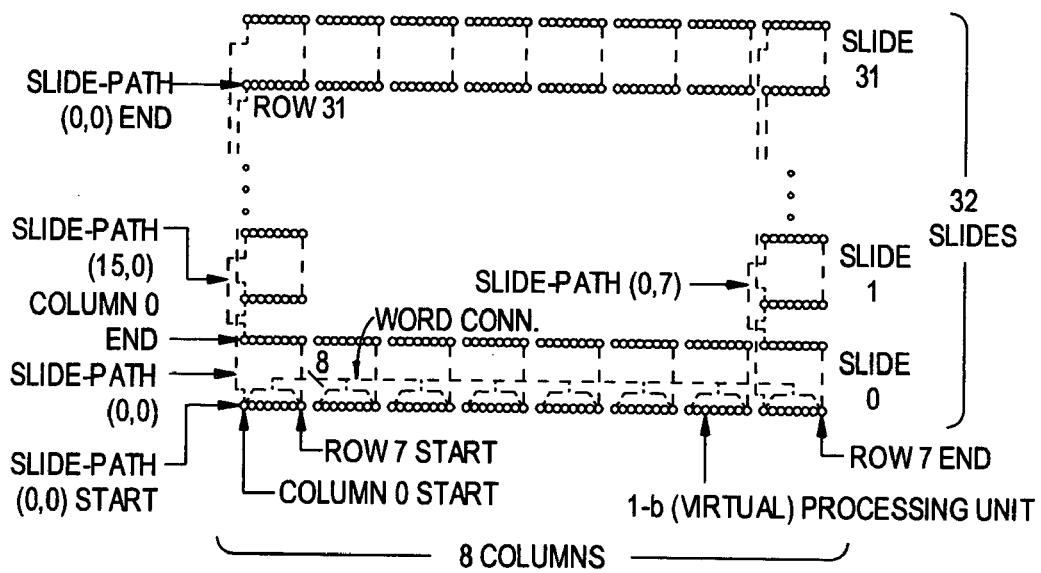
Figure 5:
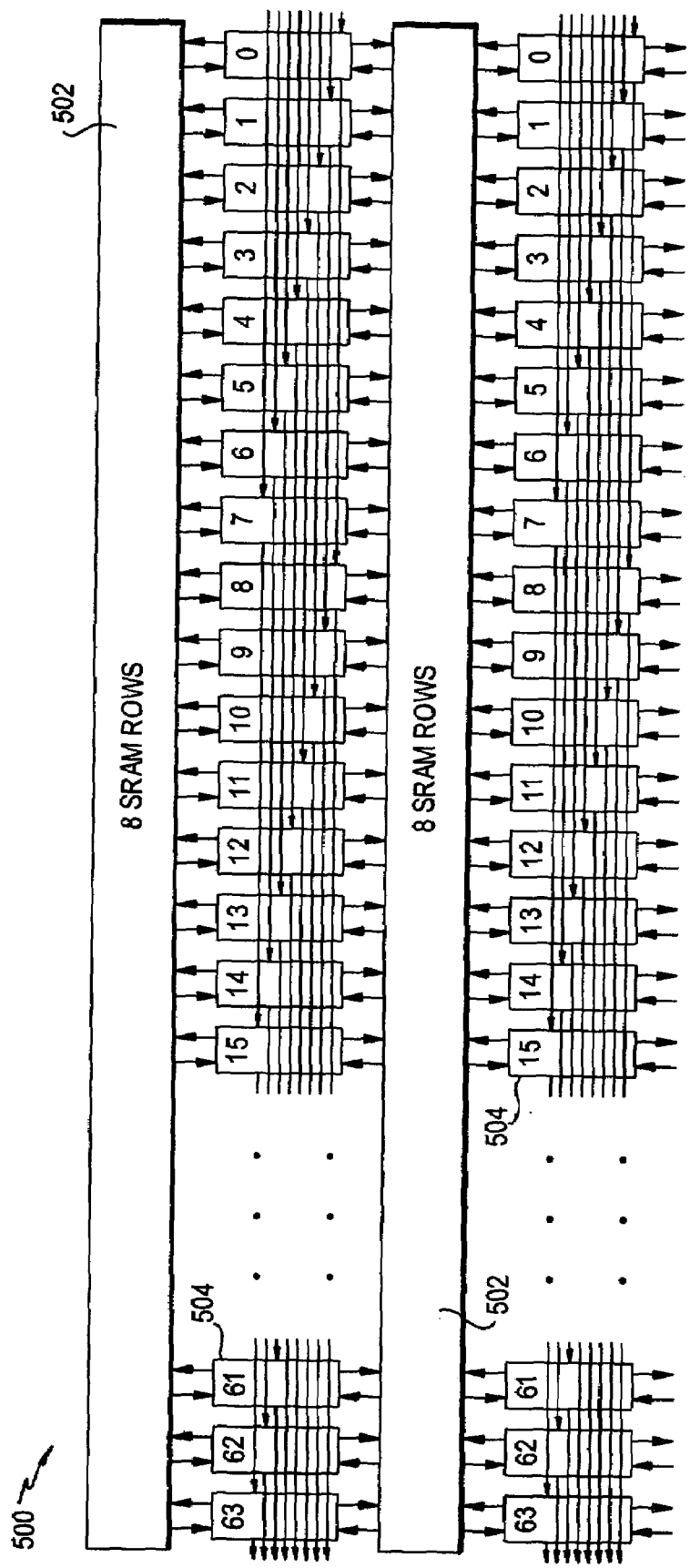
FIG. 5 shows a schematic diagram of a parallel-serial access memory based on the SRAM of FIG. 3.

The interconnections for a pixel-parallel 32×128 image page and for a voxel-parallel 8×16×32 volume block are mainly the same except that the former requires a diagonal line connection and the latter requires a 8-b word connection, as illustrated in FIGS. 4A and 4B, respectively. In a working device, the interconnections shown in FIGS. 4A and 4B can be implemented with common connections shared by both applications to form the actual Digital Accelerator's total neighboring-column interconnections. Here a small circle represents a processing logic associated with a single Digital Accelerator column while the area between two such processing logic units represents a SRAM column. The communication between two horizontal neighboring units within a same 8-column group is implemented through sense amplifiers and write drivers of the group; thus, no line connection is needed. The only exception is the end and the beginning units of two neighboring groups, which now have been linked by a diagonal line. The communication between two vertical neighboring units is provided by the vertical lines as shown in both FIGS. 4A and 4B. The communication between two neighboring in-slide-columns of a volume renderer block is implemented through the links of two 8-b words. Clearly the proposed Digital Accelerator is able to serve as either an image processor or a volume renderer. With the available vector processing capability the Digital Accelerator can even serve as a rather general graphics processing accelerator.

Finally, moving in the digital image-graphics data from a format converter and moving out the processed data to another format converter or the host machine can be accomplished through a parallel-serial access memory. Such a memory 500 is shown in FIG. 5, having arrays of shift registers 504 with two-way connections to two Digital Accelerator rows 502 (each about 8 rows) for high performance and efficient implementation. The arrays of shift registers also serve as action arrays for graphics operations (transformations). The instructions for the parallel-serial memories are designed independently from the processing instructions to improve the I/O efficiency. This is due to that the parallel-serial memories have a different access rate from the SRAM. The two types of memory access will also be considered to operated in parallel for high system performance.

Figure 6:
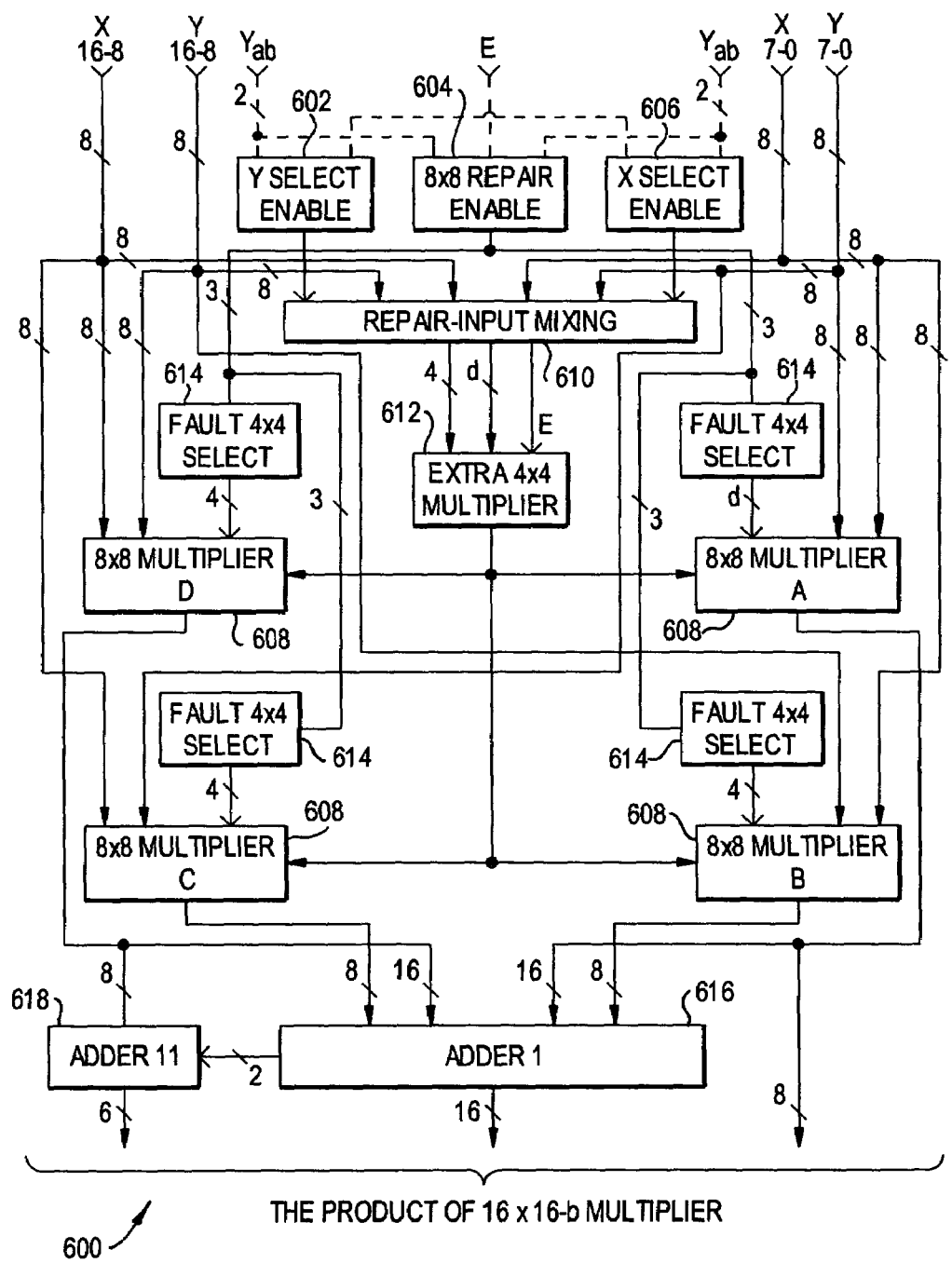
FIG. 6 shows a schematic diagram of a self-repairable arithmetic logic unit according to a second preferred embodiment.

Yet another aspect of the invention is self-repairability. FIG. 6 illustrates a self-repairable multiplier architecture modified from FIG. 1. The multiplier architecture 600 includes a Y select enable 602, an 8×8 repair enable 604 and an X select enable 606. Four multipliers 608 are provided. Also provided are a repair-input mux 610, an extra 4×4 multiplier 612 whose operation will be explained below, and, for each of the multipliers 608, a fault 4×4 select 614. The outputs of the multipliers 608 are supplied to adders 616, 618.

Four repair-select bits (Xa, Xb, Ya, Yb) plus one repair-enable bit are used to generate repair controls for all 4×4 multipliers including the extra one as shown in the top of FIG. 6. The repair-input muxing-unit takes the original inputs (i.e., two 16 bit numbers) and produces the two desired input segments for the extra multiplier. The product P0 of the extra multiplier is then distributed to all 4×4 multipliers. Then the 4×4 multiplier to be repaired, which is specified by the given 4 bits, Xa, Xb, Ya, Yb plus E, abandons its own output and replaces it by the one from the extra multiplier. It should be noticed that the power supply of the disabled unit (one of the 17 4×4 multipliers) will be turned off through a power enable control to reduce power dissipation.

The self-repairability possessed by the multiplier allows us to recover the specified faults over 4686 transistors, 54% of all 8704 transistors. The approach can be extended to recover almost all the transistors in the circuit for more faults; however, the trade-off between the yield gain and the extra cost needs to be carefully considered in practice.

Figure 7A:
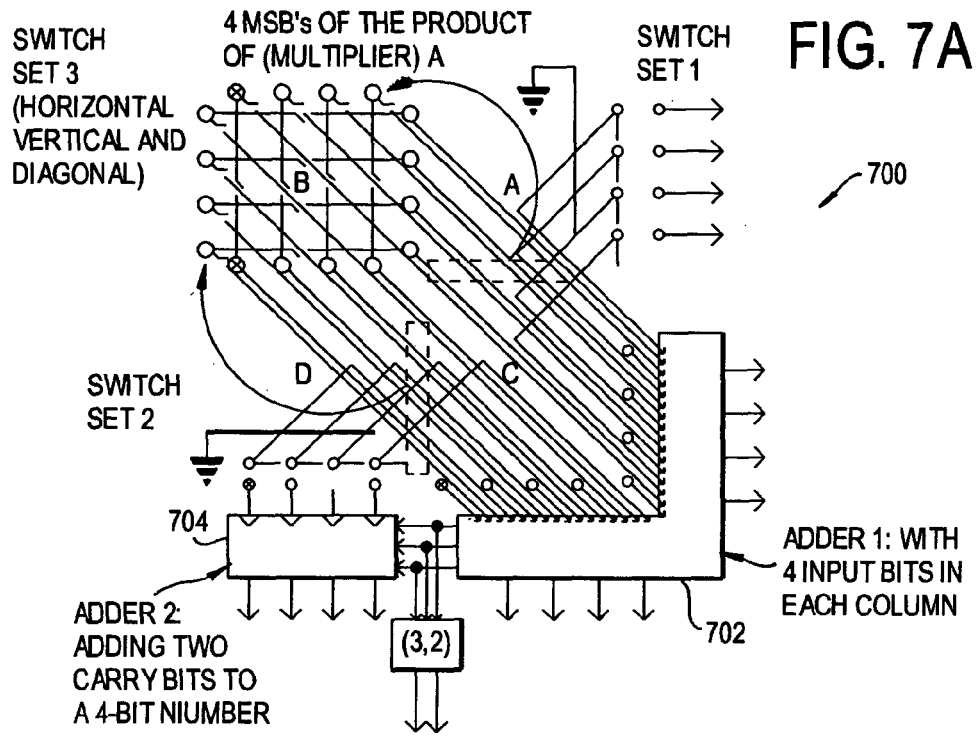
FIGS. 7A–7C show conceptual diagrams of a modification of the arithmetic logic unit of FIG. 6.

The self-repairable ALU can be provided with the ability to reconfigure itself for various operations. In that regard, we consider performing two types of computations using a single (modified) network of four 4×4 multipliers modified from FIG. 6. First, such a modified network should be able to multiply two 8-bit numbers, XY, in a way similar to that described above with reference to FIG. 16 and then able to compute the inner product of two arrays of four 4-bit items. The modification is simple and is conceptually shown in FIGS. 7A–7C (see also U.S. patent application Ser. No. 09/512,380, "Reconfigurable inner product processor architecture"), showing conceptual diagrams of an ALU 700 having adder 1 702 and adder 2 704 in various states. The 4 MSBs (most significant bits) of the Comparisons and Evaluations of the Design product of multiplier A and the 4 LSBs of multiplier D are moved to the top and the left of multiplier B. The connections from multipliers to the adders are shown by four lines for each column, and the simple reconfiguration switches, marked as switch sets 1, 2 and 3, are added in three indicated areas. Each switch has two states 0 and 1, defined as follows. When in state 1, switches in set 1 and 2 are connected to ground, diagonal switches in set 3 are on, while horizontal and vertical switches in set 3 are off. The architecture is clearly for multiplication. When in state 0, switches in sets 1 and 2 are connected to the small multiplier outputs i.e. small circles, the diagonal switches in set 3 are off while horizontal and vertical switches are on. The ALU is now configured for inner product computation.

Figure 8:
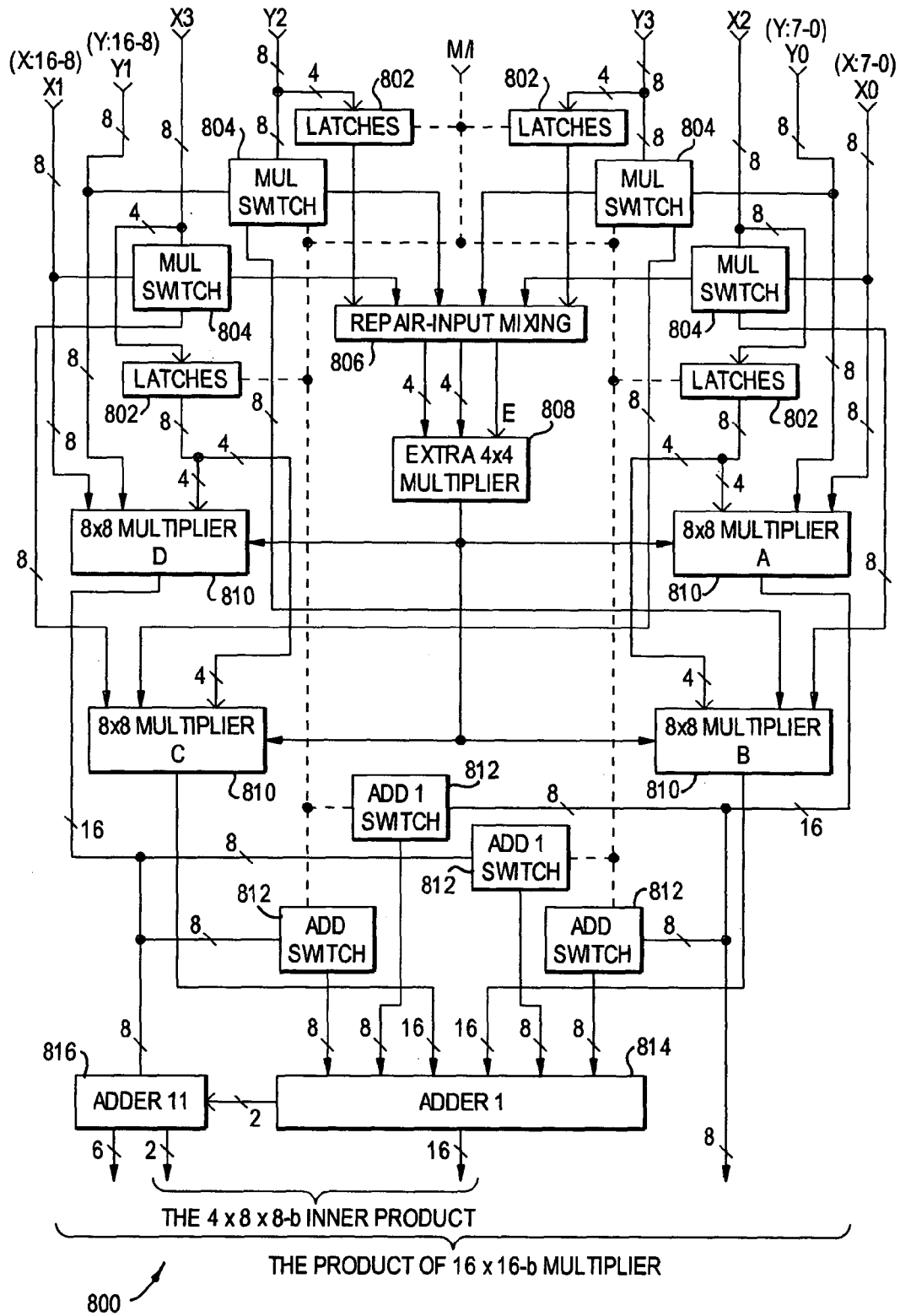
FIG. 8 shows a schematic diagram of the modification of FIGS. 7A–7C.

FIG. 8 illustrates the self-repairable and reconfigurable multiplier-inner-product processor architecture. The configuration and operation of the ALU 800, comprising latches 802, mul switches 804, a repair-input mux 806, an extra 4×4 multiplier 808, four 8×8 multipliers 810, add switches 812, an adder I 814 and an adder II 816, will be described.

We first describe the part of the new architecture supporting self-repair, then the other part supporting the reconfiguration of two operations. Five repair-control/select bits (E, Xa, Xb, Ya, Yb) and three enable units are now removed. The eight bits, which were generated by these units, used to select a pair of 4-bit input segments from X(0–15) and Y(0–15) sending to the extra 4×4 multiplier, are now provided directly from the spare input lines Y2(0–3) and Y3(0–3) to two arrays of latches during multiplication mode. The bits for selecting the fault 4×4 multiplier, i.e. for receiving the product generated by the extra 4×4 multiplier, are initially set by the spare input lines X2(0–7) and X3(0–7), and sampled by the other two arrays of latches when the operation mode is turned to inner-product. All 16 bits are set to zero, except that the one for repairing is set to 1. If no repair is needed, the 24-bit repair-code consisting of X2,X3,Y2(0–3), and Y3(0–3) is set to 0. The level-sensitive latches are open (closed) when M/I-sele is set to 1 (0), i.e. for multiplication (inner product). The input lines for sending X (or X0,X1) and Y (or Y0,Y1) to the repair-input muxing now are shared by X2 Y2,X3 and Y3, through the use of reconfiguration switches (mul switches), controlled by the M/I-sele bit.

Figure 7B:
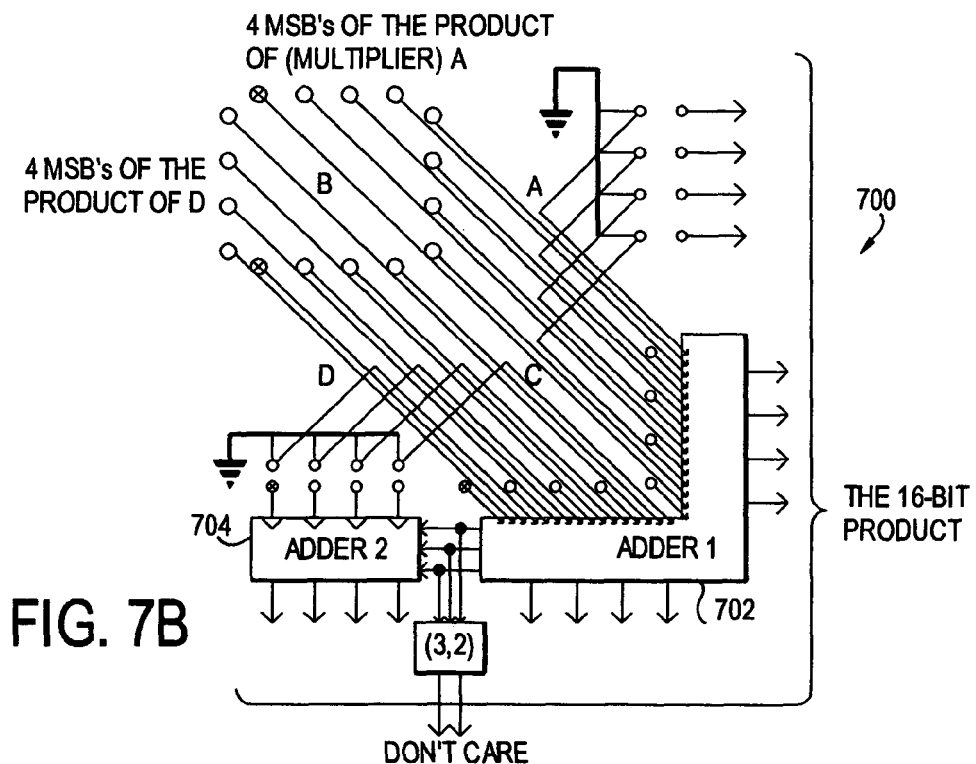
Figure 7C:
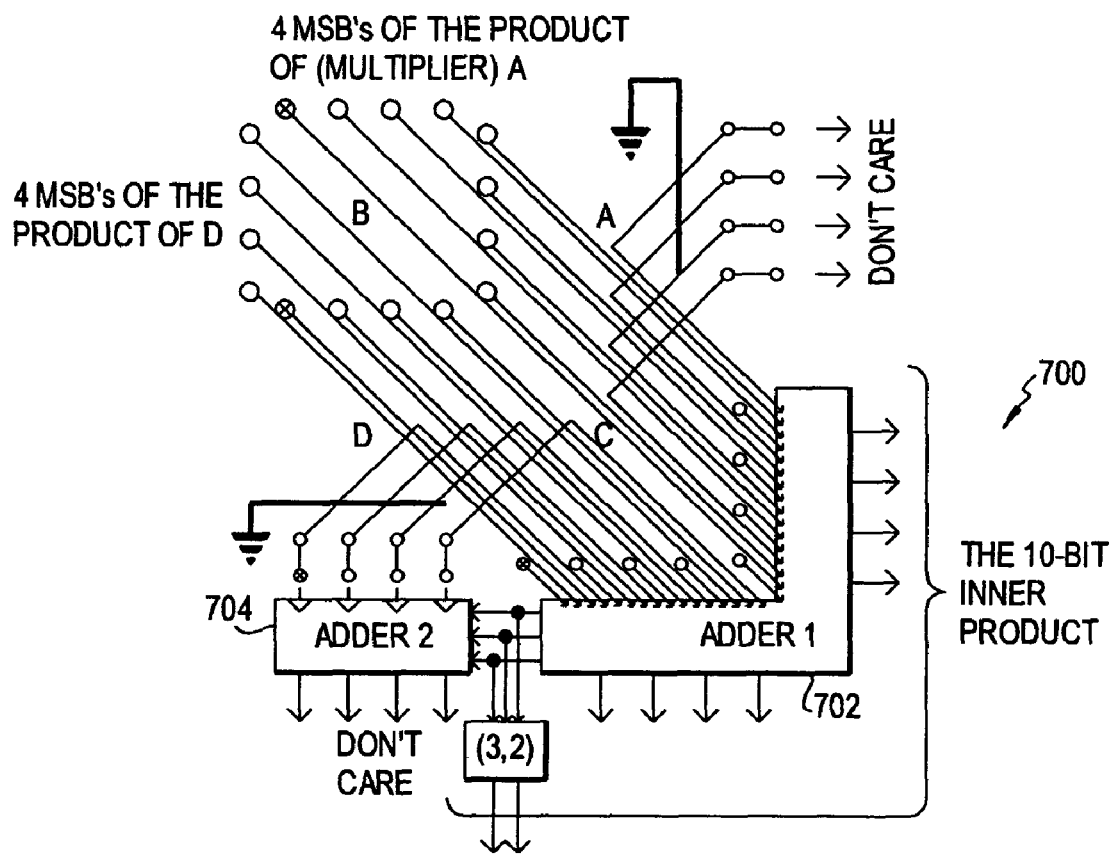

The mul switches are also used to control the sharing of routing lines, which either copy X and Y or send x2,x3, y2 y3 to the 8×8 multipliers B and C according to one of the desired operations. Furthermore, the routing lines sending the outputs of the four 8×8 multipliers to the adders I and II are now shared for two operations, as shown in FIGS. 7B and 7C, through the use of four reconfiguration switches (add and add1 switches). All the reconfiguration switches and latches are simple and directly controlled by a single extra input bit, i.e. M/I-sele. The performance of the processor shows negligible degrading compared with either a pure multiplier or a pure inner product processor. Also the power supply control for the extra 4×4 multiplier can be provided by Y2(0–3), which contains a repair-generate bit, i.e. disable if it is 0, enable if non-zero. For each of other 16 4×4 multipliers, it is provided by its own repair control bit, i.e. disable if the bit is 1, enable if 0. The self-repairability and reconfiguration possessed by the processor allow us to recover the specified faults over 4686 transistors, 52% of all 9052 transistors for two operations. The approach can be extended to recover almost all the transistors in the circuit for more faults, however, the trade-off between the yield gain and the extra cost needs to be further studied.

Figure 9:
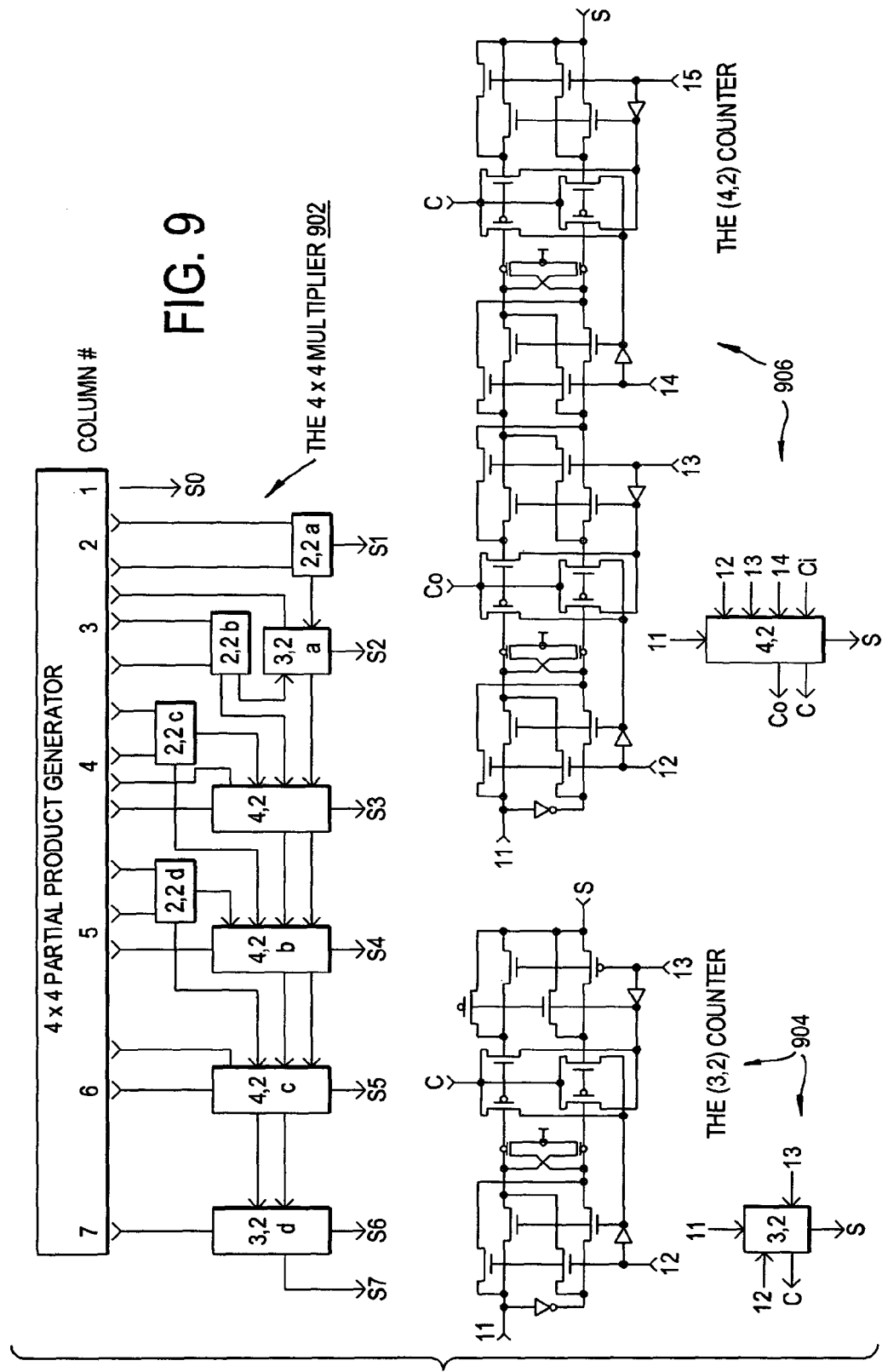
FIG. 9 shows schematic diagrams of components usable in the arithmetic logic unit of FIG. 8

Though any existing 4×4 multiplier and parallel counters may be used to implement the cost efficient processor, in this design we adopt only three small complementary pass-transistor parallel counters, (2,2), (3,2) and (4,2). FIG. 9 (See also U.S. patent application Ser. No. 09/812,030, "A family of high performance multipliers and matrix multipliers"), shows schematic diagrams of a 4×4 multiplier 902, a 3,2 counter 904 and a 4,2 counter 906. The parallel counters are tiny and robust with transistor counts of 11, 20 and 38 respectively. Since the components to be repaired, such as the 4×4 multiplier and the 4-bit group adder used in Adder-I and II, are all relatively small enough (significantly smaller than a traditional Wallace-adder-tree for the implementation), almost all counter connections within each component can be made without a buffer. This significantly reduces the VLSI area and power dissipation, while increasing circuit speed. Our preliminary layout of the components has verified the superiority of the design. The cost for the addition of the self-repairability is shown in Table II.

TABLE II

|  | transistor count | delay | test vector length | | exhaustive / pseudo exhaustive |
|---|---|---|---|---|---|
|  |  |  | exhaustive (this work) | pseudo exhaustive (reported in [8]) |  |
| non-repair multiplier A | 7352 | 4.0 ns | $1.5 * 2^{12}$ | $1.7 * 2^{11}$ | 1.76 |
| repairable multiplier B | 8704 | 4.65 ns | $1.3 * 2^{13}$ | $1.7 * 2^{12}$ | 1.5 |
| repairable inh/mut C | 9052 | 4.85 ns | $1.5 * 2^{13}$ | NA | NA |
| $\frac{B}{A}$ | 1.18 | 1.16 | 1.7 | 2 |  |
| $\frac{C}{A}$ | 1.23 | 1.21 | 2 | NA |  |
| $\frac{C}{B}$ | 1.04 | 1.04 | 1.15 | NA |  |

In addition to the superiority in construction of self-repairing and reconfiguring circuits, the decomposition-based design approach has another important advantage over the traditional designs (with a single large-partial product matrix): significantly higher controllability and observability for tests. An exhaustive test procedure can be practically developed to reduce the test cost and improve the quality of products. We show the DFT technique which is used to screen out a fault-free one over 17 possible different architectures when the processor is set to multiplication mode. The length of an exhaustive test vector is shorter than $1.5*2^{13}$.

The test procedure is obtained based on the following observations: (1) The processor can be partitioned into the following 22 components (referred to a clean partition): 16 identical 4×4 multipliers, one extra 4×4 multiplier with the repair-control units, four mid-final adders each for an 8×8 multiplier, and one final adder. (2) If there is a fault in any of the five adders or there exist more than one fault 4×4 multipliers, the circuit should be rejected as un-repairable. (3) To exhaustively test a specified 4×4 multiplier the corresponding inputs of X(0 . . . 15) and Y(0 . . . 15) can be generated as follows: generate all combinations of X(4i . . . 4i+3),Y(4j . . . 4j+3) pairs for the given 0 †i,j †3, then for each pair of them add 0s into all remaining bit positions to result in a pair of the test inputs; (note that this will guarantee that all 4×4 multipliers, except the specified, always generate a product of 0 (if one does not, the fault will be detected by our procedure below). (4) A 4×4 multiplier test output received from the final adder is always the sum of the actual output of the multiplier and four 4-bit 0s, two added to the sum in mid-final adder and another two added to the sum in the final adder (plus a number 0 provided by add1 switches). (5) If for all input combinations the test results of a 4×4 multiplier are correct, we say the 4×4 multiplier is fault free (the proof is omitted). (6) If all 16 4×4 multipliers (including the case of one being repaired) are all fault-free then any inputs (three numbers) to any mid-final adder are all fault-free; thus, a mid-final adder can be tested exhaustively column by column. Note that each column may have up to three carry-bits, and only the sums of the carries can be tested correctly; however, that is good enough for the functionality test. All that is needed is that for each column we provide pre-generated all possible inputs to it and compare each test result with the pre-generated correct result. (7) If all mid-final adders are fault-free then the final adder can be tested in the same way.

The repairing procedure (finding a 4×4 multiplier to be replaced by the extra one) will now be described. Assume that the 16 4×4 multipliers are denoted by M1, M2, . . . , M16, and the extra one by M0. We set a temporary repair-code for Mn as: set the repair-control bit, X2(n)=1, if n<8, or X3(n−8)=1 if n>8; also set two repair-generate bits, Y2(n DIV 4)=1; Y3(n MOD)=1, and finally set all other 21 bits in X2X3Y2(0–3)Y3(0–3) to 0.

Step 1. Set fault-list empty and n=1.

Step 2. Exhaustively test 4×4 multiplier Mn as described in (3) above. If a fault is found, add number Mn to the fault-list and then replace Mn by M0 (note that no re-test for the new Mn at this time).

Step 3. Let n++. If n<17 go to Step 2, if n=17 then exhaustively re-test all multipliers in the fault-list; if fault is found, reject the circuit as un-repairable immediately, otherwise declare the current architecture being fault-free.

Step 4. If it is fault-free, set the 24-bit repair-code as follows: if fault-list is empty set all 24 bits 0, otherwise assume that Mj is the one finally replaced by M0, set the Mj's temporary repair-code as the final re-pair-code.

The proof of the correctness of the procedure is straightforward: once the only fault multiplier has been replaced by a good one, then all 4×4s will be tested as fault-free, i.e. all Mi in the fault-list, except the last one, are not candidates for repairing. Since the two operations use the same set of hardware, with the multiplication involving a larger final adder, the test for multiplication will be sufficient if we also include a few tests for the reconfiguration state changes. Now we have the complete-test procedure Step 1. Call the above repairing procedure. If reject, exit (claim the circuit un-repairable).

Step 2. Column by column test all mid-final adders as described in (6) above. If there is a fault, exit.

Step 3. Column by column test the final adder column by column as described in (7) above, if there is fault exit, otherwise accept the circuit as fault free and return the 24-bit final repair-code.

The total length of the complete-test vector is shorter than $1.5*2^{13}$. For all 4×4 tests the vector length is $2*16*256=2^{13}$, and for all mid-final and final adders tests, the length is $3*25*(13+20+9)<2^{12}$ (note that each column has a maximum of 26 possible inputs). The test vector length is as short as that required by the pseudo-exhaustive DFT method, which requires a vector length 256+x (including a few dozens of random tests) for an 8×8 multiplier, and a total test length about $4*(256+x)*4+2^{11}=1.7*2^{12}$ (for x=44) for the 16×16 repairable multiplier.

Based on our preliminary study, the superiority of the proposed Digital Accelerator architecture and design according to either of the preferred embodiments can be summarized as follows:

The proposed accelerator will feature maximum utilization of memory bandwidth, minimum area for the processing logic, maximum covering of desirable operations, minimum or near minimum operation delays.

This can be briefly explained through four observations on the proposed design, which have been verified or partially verified by the our recent works and simulations: (a) The main processing logic, i.e. the 4×4 multipliers based 16-b ALU, has a significantly reduced area compared with a regular 16×16 multiplier. It uses 4, instead of 16 (as regularly needed) 4×4 multipliers. This is possible because the bit matrix decomposition scheme applied in the design allows the flexible trading between processing length and processing size without actual change in structure. Using 4 short operations each involving only about a quarter of data processing space of the process, instead of one long operation involving whole data space, is realizable in the design. (b) Since only 16 Digital Accelerator columns share such a main ALU, the memory bandwidth is fully (i.e. at the sense amplifiers level) utilized. (c) To make all the proposed operations available with the same memory bandwidth in the comparable speed using any other known ALUs would require at least 5 to 6 times more VLSI area. However, the existing PIM architectures with 16-b multipliers and more do not fully utilize memory bandwidth, i.e. each of their expensive conventional 16-b ALUs is usually shared by more than 16 RAM columns (assuming one equivalently holding a pixel/voxel data) thus reducing total ALU area while lowering the performance. Our ALU is about three times less than any counterpart designs while having the competitive speed. (d) By using 4×4 multipliers, a perfect delay balance can be achieved when the processing logic works in parallel with the memory access. SRAM with 0.15 um, 1.5V technology has an access delay 1.3 ns to 1.7 ns which matches the proposed main processing logic delay (1.5 ns). This means any other ALU of higher speed will not improve the actual operation significantly due to the memory wall in the chip (it still exists in PIM design, but does not have the same degree of effect as a conventional memory wall). Note that the optimal or near optimal delay balance may be achieved through a selection from several trading forms in the proposed scheme.

The proposed unique approach and design have shown a potential for a large improvement of a computational/intelligent memory. TABLE II shows a comparison of the previously presented PEs with our proposed approach. The comparison is in the transistor count, the number of cycles required to perform a 16-b×16-b multiplication, bit-width or column width to which the PE is pitch-matched, the type of operation the PE performs, the logic implementation and the flexibility. The advantages of our approach are that it has lower transistor count (low complexity) than other static (16-b) designs, it performs the multiplication significantly faster on larger amount of data, it will consume small amount of power due to its static topology, it will be scalable because it doesn't suffer from threshold voltage degradation as in dynamic pass transistor implementations and it provides great flexibility because the PE can perform also smaller scale multiplication and inner product directly. This flexibility and all other features make the proposed architecture highly suitable for image, graphics, and video processing.

TABLE III

Comparison of Processing Elements

| PE Architecture | Transistor Count (per-col) | 16 × 16 Multiply for $2^{12}$ (pixels) (cycles) | Operation | Logic | Flexible |
|---|---|---|---|---|---|
| CRAM Simple PE | 88 | 1024 | 1 | dynamic | no |
| CRAM Complex PE | 147 | 1024 | 1 | dynamic | no |
| DSP-RAM | 988 | 4096 | 16 | static | no |
| IMAP | 88 | 200 | 8 | static | no |
| Pixel-Parallel | 95 | 1007 | 1 | dynamic | no |
| Abacas-Booth | NC* | 655 | 1 | static | no |
| Proposed | 247 | 64 | 8, 16, 32 | static | yes |

*NC—not comparable

The present invention provides a new digital accelerator architecture for image and graphics processing applications. The proposed accelerator provides operational flexibility, simple expandable design, low-cost, low-power and highly efficient solution. It outperforms previously proposed processing-in-memory architectures in speed, area and power by up to several orders of magnitude. The internal PE performance matches the memory access time, which eliminates any idle times and power wastes. Several implementations have been designed using 0.18 μm and 0.25 μm CMOS technology.

Various aspects of the invention have been disclosed in the following publications, which are hereby incorporated by reference in their entireties into the present disclosure:

Lin, R., and Margala, M., "Novel Design and Verification of a 16×16-b Self-Repairable Reconfigurable Inner Product Processor," in *Proceedings of ACM Great Lakes Symposium on VLSI*, New York City, N.Y., pp. 172–177, Apr. 18–19, 2002;

Lin, R., Margala, M., Kazakova, N., "A Novel Self-Repairable Parallel Multiplier Architecture, Design and Test," in *Proceedings of the 3rd IEEE Asia-Pacific Conference on ASICs*, Taipei, Taiwan, 6–8 Aug., 2002; and Margala, M., Lin, R., "Highly Efficient Digital CMOS Accelerator for Image and Graphics Processing," in *Proceedings of the 15th Annual IEEE International ASIC/SOC Conference*, Rochester, N.Y., pp. 127–132, 24–26 Sep., 2002.

While a preferred embodiment of the present invention and various modifications thereof have been set forth above, those skilled in the art who have reviewed the present disclosure will readily appreciate that other embodiments can be realized within the scope of the invention. For example, numerical values are illustrative rather than limiting, as are intended uses. Therefore, the present invention should be construed as limited only by the appended claims.

We claim:

1. A computational random access memory comprising:
    a memory comprising N columns, N being an integer; and
    an arithmetic logic unit, in communication with the N columns in the memory, the arithmetic logic unit comprising:
    M multipliers, M being an integer divisible into N, each of the M multipliers being configured to multiply two N/M-bit numbers; and
    an adder stage, in communication with the M multipliers to receive outputs of the M multipliers, for forming and outputting calculation results in accordance with the outputs of the M multipliers,
    wherein the arithmetic logic unit is configured to multiply two N-bit numbers by:
    (a) multiplying, in the M multipliers, a plurality of combinations of N/M bits of the two N-bit numbers to form a plurality of partial products; and
    (b) accumulating, in the adder stage, the plurality of partial products to provide a product of the two N-bit numbers,
    wherein the arithmetic logic unit is configured to add two N-bit numbers by multiplication by one in the multipliers and forming a sum in the adder stage.

2. A computational random access memory comprising:
    a memory comprising N columns, N being an integer; and
    an arithmetic logic unit, in communication with the N columns in the memory, the arithmetic logic unit comprising:
    M multipliers, M being an integer divisible into N, each of the M multipliers being configured to multiply two N/M-bit numbers; and
    an adder stage, in communication with the M multipliers to receive outputs of the M multipliers, for forming and outputting calculation results in accordance with the outputs of the M multipliers; wherein:
    the memory comprises a plurality of groups of N columns;
    a plurality of said arithmetic logic units are provided, one for each of the plurality of groups of N columns; and
    the computational random access memory further comprises a secondary processing logic, in communication with the plurality of arithmetic logic units to receive outputs of the plurality of arithmetic logic units, the secondary processing logic comprising a plurality of adders for combining calculation results from the plurality of arithmetic logic units to permit calculations on numbers of more than N bits.

3. The computational random access memory of claim 2, wherein the plurality of groups of N columns of the memory are arranged in a plurality of rows, each of the plurality of rows comprising said arithmetic logic units and said secondary processing logic.

4. The computational random access memory of claim 3, wherein, in each of the rows, the groups of columns are interconnected by a diagonal connection.

5. The computational random access memory of claim 3, wherein, in each of the rows, the groups of columns are interconnected by an N-bit word connection.

6. The computational random access memory of claim 5, wherein, in each of the rows, the groups of columns are also interconnected to a diagonal connection.

7. The computational random access memory of claim 6, further comprising a plurality of two-way shift registers, each interconnecting two of the groups of N columns in two of the rows.

8. A computational random access memory comprising:
    a memory comprising N columns, N being an integer; and
    an arithmetic logic unit, in communication with the N columns in the memory, the arithmetic logic unit comprising:
    M multipliers, M being an integer divisible into N, each of the M multipliers being configured to multiply two N/M-bit numbers; and
    an adder stage, in communication with the M multipliers to receive outputs of the M multipliers, for forming and outputting calculation results in accordance with the outputs of the M multipliers; wherein:
    the arithmetic logic unit further comprises a repair multiplier in addition to the M multipliers; and
    each of the M multipliers comprises an input for receiving a repair signal which controls that multiplier to replace its output with an output received from the repair multiplier.

9. The computational random access memory of claim 8, wherein the arithmetic logic unit further comprises a repair-input muxing unit for selecting inputs to the repair multiplier.

* * * * *